March 3, 1931. P. E. BARKER Re. 17,984

WASHING MACHINE

Original Filed Dec. 17, 1921 5 Sheets-Sheet 1

INVENTOR:
PERCY E. BARKER

BY George W. Saywell
ATTORNEY

March 3, 1931. P. E. BARKER Re. 17,984

WASHING MACHINE

Original Filed Dec. 17, 1921 5 Sheets-Sheet 2

INVENTOR:
PERCY E. BARKER

BY George W. Saywell
ATTORNEY.

March 3, 1931. P. E. BARKER Re. 17,984

WASHING MACHINE

Original Filed Dec. 17, 1921 5 Sheets-Sheet 3

INVENTOR:
PERCY E. BARKER
BY
George W. Saywell
ATTORNEY.

March 3, 1931. P. E. BARKER Re. 17,984

WASHING MACHINE

Original Filed Dec. 17, 1921 5 Sheets-Sheet 4

INVENTOR:
PERCY E. BARKER
BY
George W. Sayrell
ATTORNEY.

March 3, 1931. P. E. BARKER Re. 17,984

WASHING MACHINE

Original Filed Dec. 17, 1921 5 Sheets-Sheet 5

INVENTOR:
PERCY E. BARKER
By George W. Saywell
ATTORNEY.

Reissued Mar. 3, 1931

Re. 17,984

UNITED STATES PATENT OFFICE

PERCY E. BARKER, OF CLEVELAND, OHIO, ASSIGNOR, BY MESNE ASSIGNMENTS, TO THE CINDERELLA WASHING MACHINE COMPANY, OF CLEVELAND, OHIO, A CORPORATION OF OHIO

WASHING MACHINE

Original No. 1,624,461, dated April 12, 1927, Serial No. 523,117, filed December 17, 1921. Application for reissue filed April 10, 1929. Serial No. 354,118.

This specification is an amended specification of United States Letters Patent No. 1,624,461 of April 12, 1927, issued for the same invention.

This invention relates to improvements in machines for washing dishes and other articles, such as clothes.

The objects of this invention are to provide a washing machine in which dishes or other articles can be washed, rinsed and dried, with means for agitating the water during the washing operation and for circulating a current of air over the dishes or other articles for drying the same; to provide means whereby the heat and steam from the wash water may be conserved during the washing and rinsing operations and fresh air circulated and renewed during the drying operation; to provide a detachable deflector cap for determining the source and character of the air forced through the machine; to provide a fan in the machine casing for effecting circulation of air through the machine together with means for protecting the same from the water in the casing; to provide an improved sectional casing and a removable rack to permit convenient shipping and assembly of the same as well as loading and unloading when in actual use; and to provide an improved rack structure and means for supporting the same within the casing, for use in washing dishes and analogous articles. However, the machine may be used for washing articles other than dishes, with or without a rack suitable for supporting such other articles.

Other objects of the invention will be apparent from the following description and claims when considered together with the accompanying drawings, which illustrate my invention as applied to a machine for washing dishes.

Figure 1:
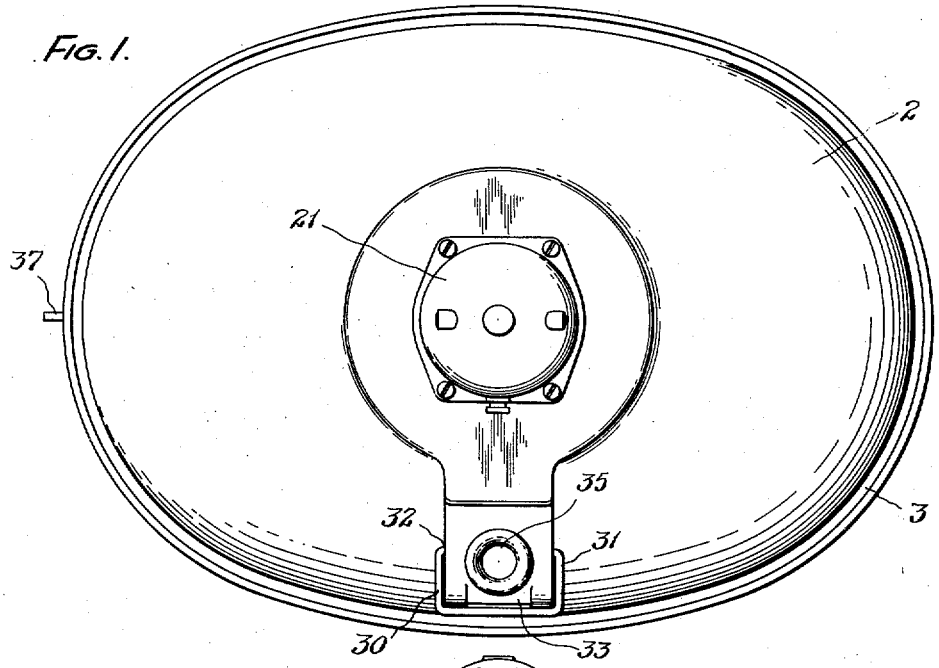
Figure 2:
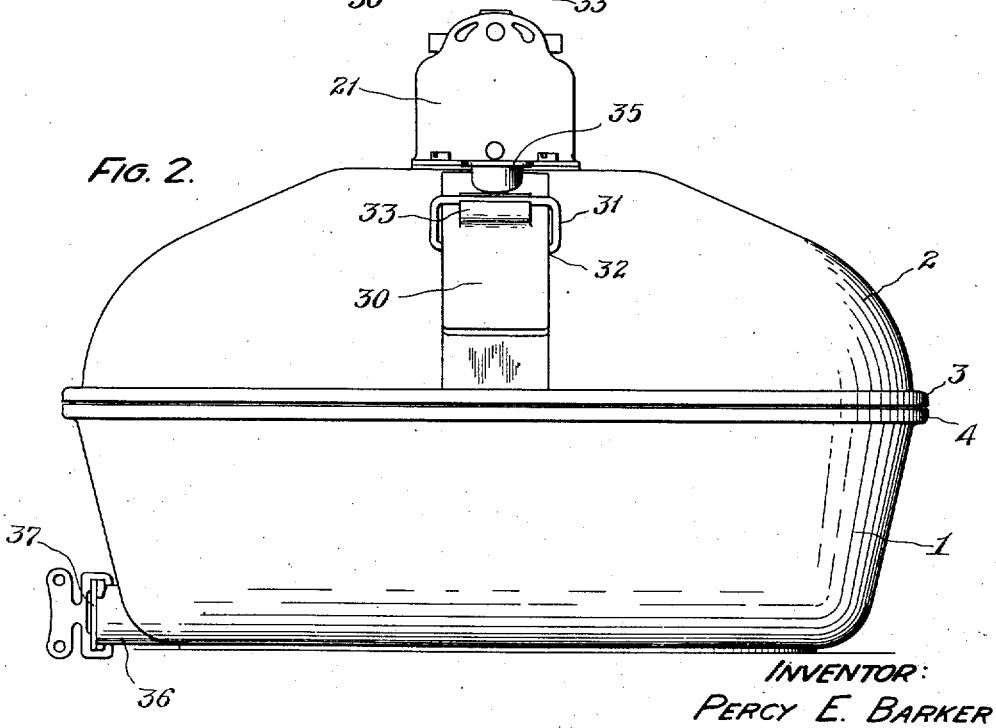
Figure 3:
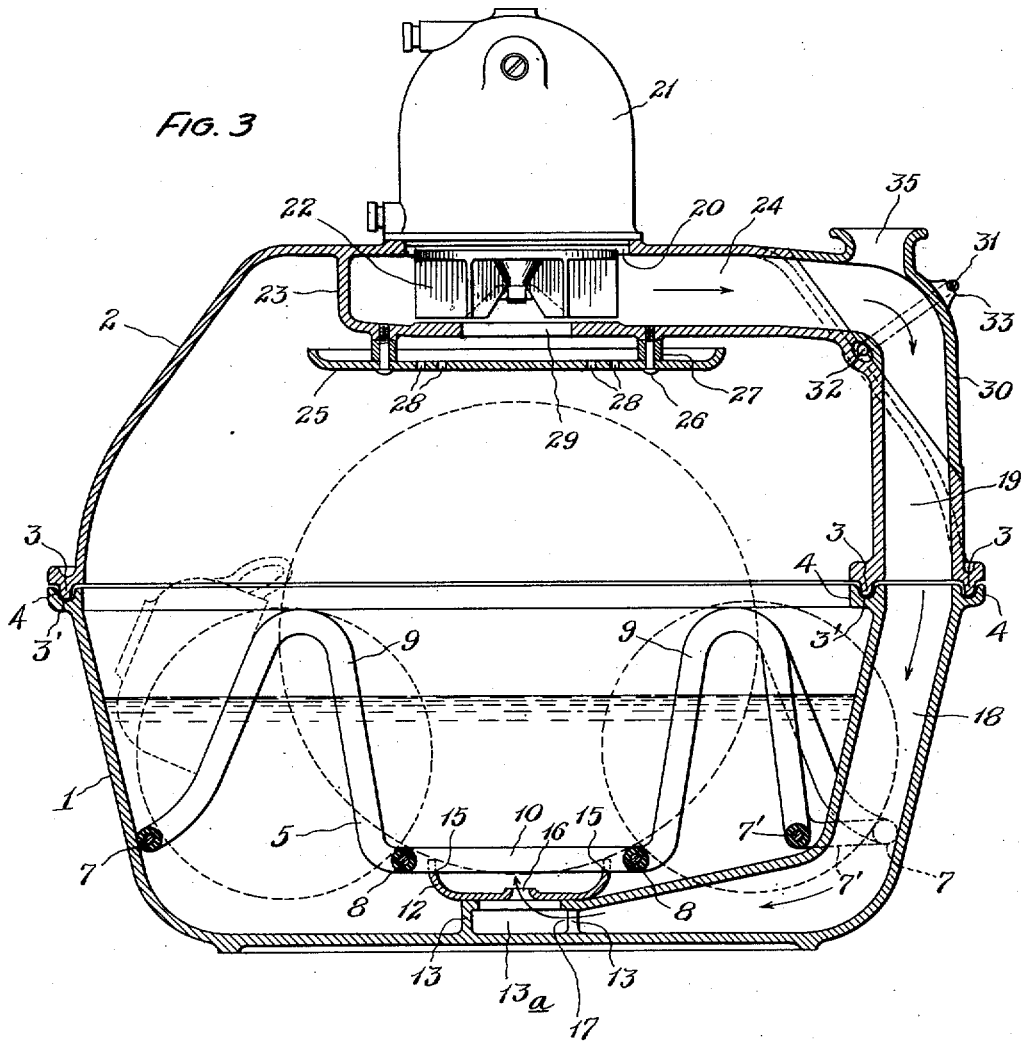
Figure 4:
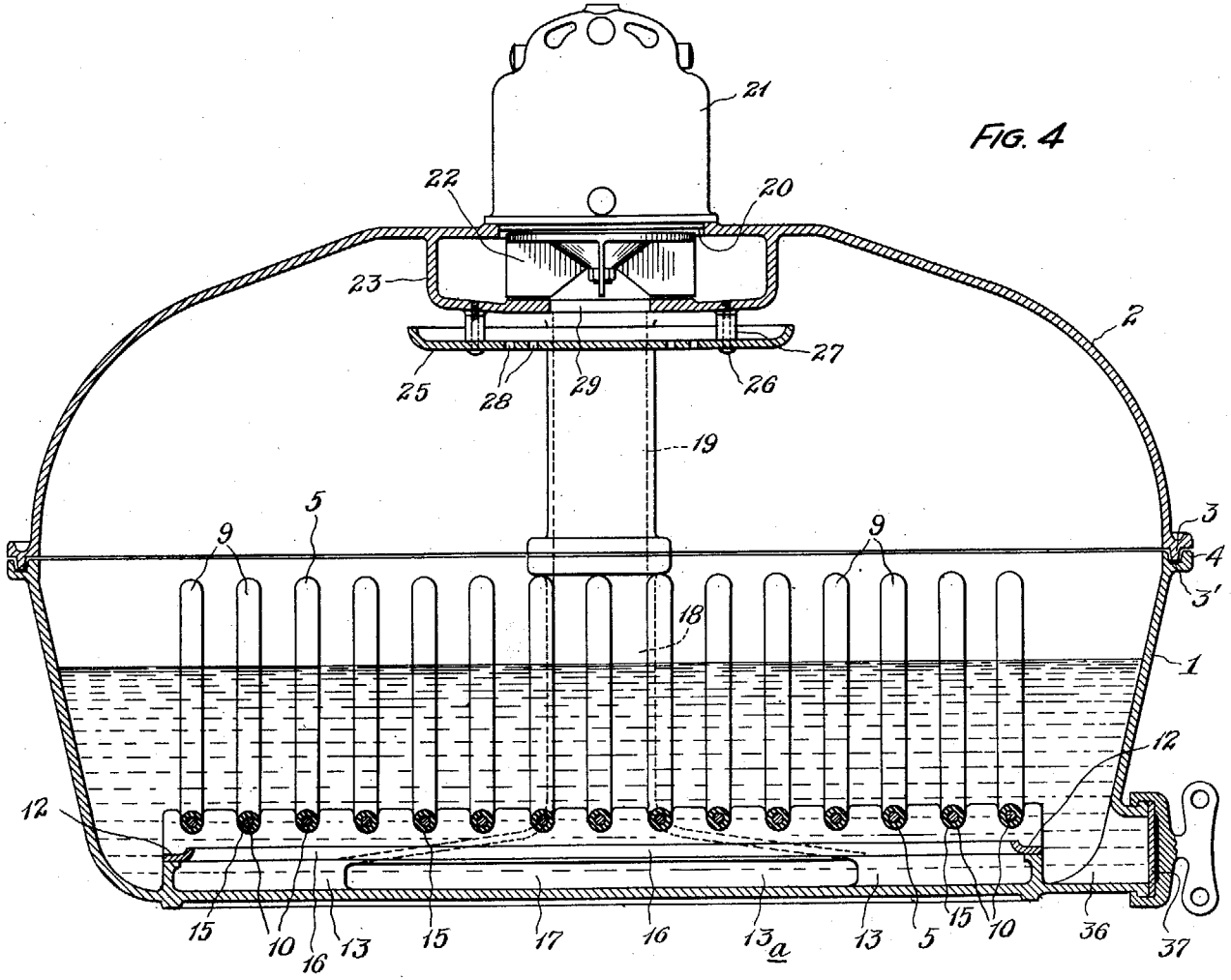
Figure 5:
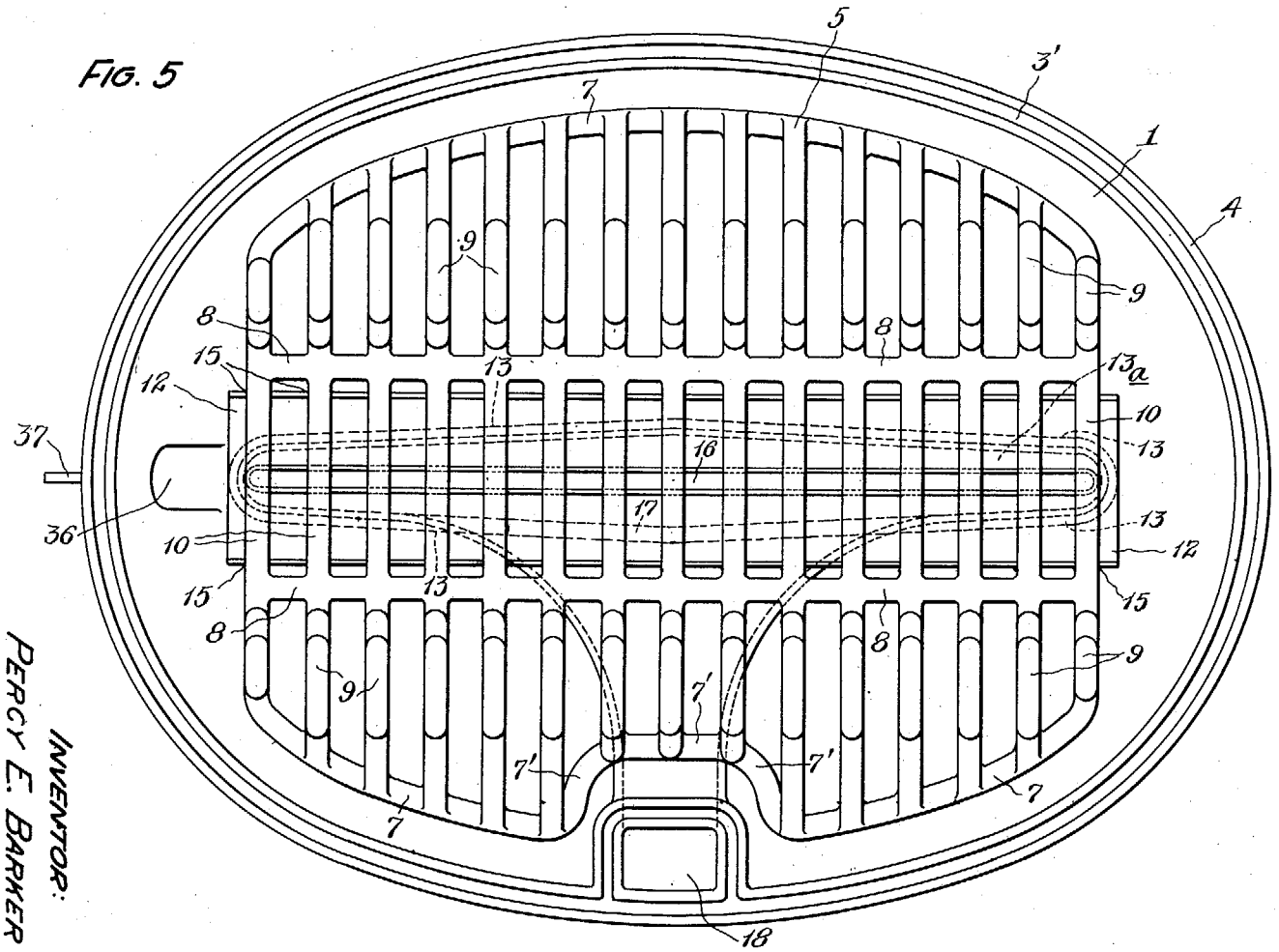
Figure 6:
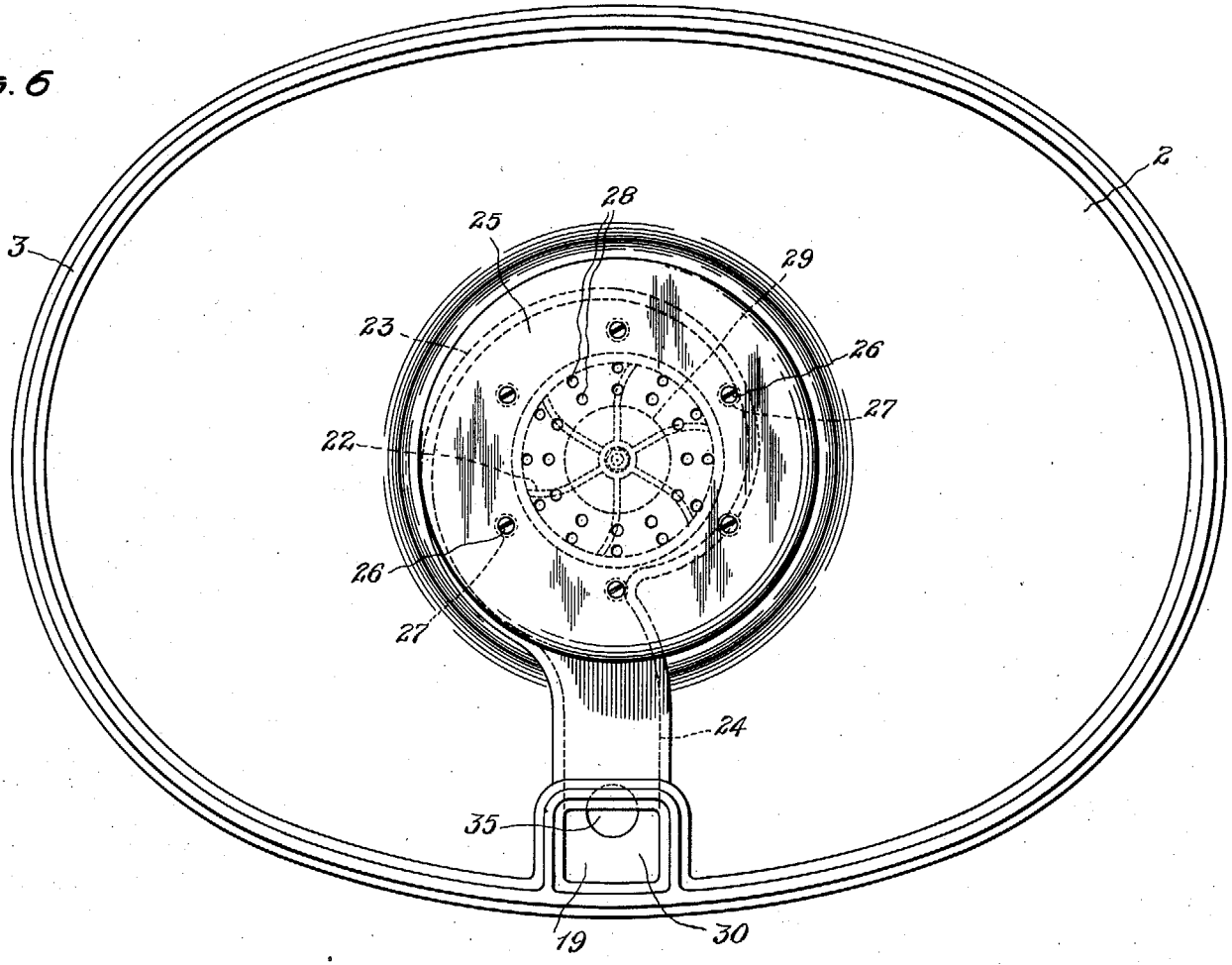

Figure 1 is a top plan view of my improved washing machine; Figure 2 is a side elevation; Figure 3 is a vertical transverse section; Figure 4 is a vertical longitudinal section; Figure 5 is a plan view of the lower half of the device; and Figure 6 is an inverted plan view of the upper part of the device.

The casing in the present device comprises the substantially elliptical members 1 and 2 which are seated one upon the other by means of the flange 3 depending from the upper member into the correspondingly formed channel 4 around the lower member. The rubber gasket 3′ forms an air-tight joint and the particular shape of casing adapts it to seat in the ordinary kitchen sink or on the drain board. The lower member is provided with a rack for holding the dishes or other articles while the upper member is provided with a motor driven fan, preferably a suction fan, for effecting circulation of vapor or air through the water in the lower member during the washing operation, as well as during the rinsing operation if so desired, and later for effecting circulation of outside air over the dishes or other articles for drying the same, as will appear later.

The rack shown in the drawing is designed especially to support dishes in the lower member and comprises a wire frame 5 of the form and structure as here illustrated, this frame being covered with rubber by dipping the same into a rubber composition. This rack, as viewed in Figure 3, comprises the marginal strands 7, the intermediate strands 8, and a plurality of transversely extending strands 9 of a configuration between the marginal and intermediate strands resembling an inverted V, indicated at 9. The middle portions of the transverse strands are substantially horizontal as indicated at 10. This rack is supported upon the trough member 12 which in turn is suitably secured upon the upstanding projections 13 which are cast integrally at the bottom of the lower casing member 1, these members forming a passage 13*a*. The trough member is notched, as indicated at 15, for the seating of the lower transverse portions of the rack, as clearly indicated in Figures 3 and 4.

In the bottom of the trough member, which is open entirely throughout its top, is provided the comparatively restricted slot 16 for passage therethrough of the vapor or air which is set in circulation by the suction fan. One of the upstanding projections 13 is also provided with an opening 17 forming part of the passage for the vapor or air which is forced through the opening 16. The vapor or air is forced through a conduit which is formed by complementary conduit sections provided in the upper and lower casing members and which are adapted for registry with each other upon assembly of the upper and lower parts of the casing. The lower conduit is indicated at 18 while the conduit in the upper casing member is indicated at 19; and it will be noted that the lower conduit has communication through the opening 17 with the passage 13*a* formed by the trough member 12 and the upstanding projections 13. It is noted also that the rack is provided with suitably formed offsets 7′ about the two sides of the conduit 18 so that the conduit in the lower casing member will not interfere with the seating of the rack.

The upper casing member 2 is provided with an opening 20 through the top thereof which is closed by means of an electric motor 21 whose base is secured in any suitable manner over the opening 20, the motor resting upon the top of the casing. A fan 22 is fixed to the rotor shaft of the motor 21 and located in the top part of the casing portion 2. An integrally formed auxiliary casing member 23 surrounds the fan, is of a substantially convolute form, and also in combination with the top of the casing member 2 forms the conduit 24 which has communication with the conduit 19. A circular guard plate 25 is secured by means of bolts 26 and spacers 27 in spaced relation to the under face of the auxiliary casing member 23, the purpose of this guard plate 25 being to protect the fan from the water in the lower part of the casing. The plate 25 is perforated, however, as indicated at 28, so as to permit the passage of vapor or air therethrough as it is sucked by the fan up through the casing. The bottom of the auxiliary casing 23 is provided with the circular opening 29. The perforations in the plate 25 also permit the draining of any water that might be splashed thereonto.

On one side and at the upper corner portion of the upper part of the casing I have provided the detachable deflector cap 30 which is secured in position on the casing by means of the bail 31 pivoted to the casing member at 32 and adapted to engage over the projection 33 provided on the cap. This deflector cap 30 is formed with an upper flanged opening 35 leading to atmosphere, the cap 30 forming an intermediate part of the conduit which comprises the conduit sections 24 and 19, so that when the deflector cap is secured in position, as shown in Figure 3, continuous passage is provided for the vapor or air. This deflector cap is secured in such position during the washing operation as well as the rinsing operation, if so desired, so that the warm air and steam from the water in the casing will be sucked up by the fan and discharged therefrom into the duct 24. Atmospheric pressure through the opening 35 causes this vapor and steam to be forced through the ducts 24, 19 and 18, rather than out through the opening 35, and thence up through the wash water, a vacuum having been created above the wash water by the fan. Thus the heat of the water is conserved. When, however, it is desired to dry the dishes, the deflector cap is removed so that outside, comparatively dry air will by virtue of its atmospheric pressure pass through the duct 19, which is now open to the atmosphere, and be drawn up through the casing by the vacuum created by the fan; while the air after being used will be discharged from the duct 24 to the outside atmosphere. The opening 35 may be used also as a means of filling the casing with water to the level indicated in Figure 4, or it can be filled by attaching a discharge tube connected at one end to outlet 36 and at its other end to a source at sufficient elevation.

For operating the machine to wash dishes, the latter are placed upon the rack in the manner indicated in broken lines in Figure 3, the plates resting upon the intermediate strands 8 between the strands 9. Water is then supplied to the casing to the proper level. With the deflector cap 30 secured in position, the warm air and steam will be sucked up by the fan, thereby creating a vacuum above the water, the atmospheric pressure through opening 35 causing circulation of such vapor through the casing so as to cause agitation and aeration of the water. The opening 35 maintains the pressure in the duct 19 substantially at atmospheric. The passage of air up through the restricted slot 16 in the bottom of the trough member 12 forces the water up out of the trough, whereupon the water from the sides of the casing rushes in to again fill the trough. Thus the water is swished from side to side and is spurted intermittently upwardly as the trough is alternately emptied and filled. Upon completion of the washing operation the wash water is drained through the discharge outlet 36, provided with a suitable closure 37. Running of the fan during the draining operation will continue to agitate the water until it is all discharged, and thus the grease and dirt suspended in the water is prevented from depositing in the casing. The dishes are then rinsed, with or without the fan, preparatory to drying. In order to circulate fresh and comparatively dry air over the dishes, the deflector cap 30 is removed so that outside air is drawn into the ducts 19 and 18, this air being discharged horizontally through the conduit 24.

It is clear that this machine may be used for washing articles other than dishes, either with or without a rack, and that, when using a rack, the latter may be of a form suitable for supporting such other articles, instead of the dish supporting rack shown in the drawings. My invention therefore is not limited to a machine for washing dishes, but is applicable to any washing machine or appliance which employs the same novel principle of operation as the machine described above and illustrated in the accompanying drawings, regardless of the particular articles to be washed by such machine or appliance, and the following claims where the context permits are intended to be construed accordingly.

What I claim is:

1. A dish washing machine comprising a casing for holding dishes, means in the upper part thereof for withdrawing air from the upper part of the casing, and a conduit having communication with the discharge side of said means and open to atmosphere and having communication with the lower part of the casing for the passage of vapor or air therethrough.

2. A dish washing machine comprising a casing for holding dishes, means in the upper part of said casing for effecting circulation of vapor from above the washing fluid through the casing during the washing operation, including a conduit leading to the lower part of said casing, and a detachable deflector cap forming part of said conduit, whereby upon removal of said cap outside air can be circulated through the casing.

3. A dish washing machine, comprising a casing, a trough member in the lower portion thereof, a dish rack removably supported upon said trough member, said trough member being provided with a slot through its bottom having communication with a source of air supply, and means in the upper part of the casing for effecting circulation of vapor or air through said slot so as to pass up through the casing.

4. A dish washing machine comprising a casing for holding dishes, means in the upper part of said casing for effecting circulation of vapor from above the washing fluid through the casing during the washing operation, including a conduit leading to the lower part of said casing, and a detachable deflector cap forming part of said conduit, whereby upon removal of said cap outside air can be circulated through the casing, said cap being provided with an opening to atmosphere.

5. A washing machine comprising upper and lower casing members, the walls of which enclose a chamber, means within the chamber of the upper casing member for effecting circulation of vapor or air through said casing members, and a circulation conduit lying within the walls of said casing and extending from the upper part of the upper casing member to the lower part of the lower casing member.

6. A washing machine comprising a liquid receptacle, means for withdrawing air from the upper part of the receptacle, and a conduit having communication with the discharge side of said means and constantly open to atmosphere and having communication with the lower part of the receptacle for the passage of vapor or air therethrough.

7. A washing machine comprising upper and lower casing members, means in the upper casing member for effecting circulation of vapor or air upwardly through said casing members, and a conduit constantly open to atmosphere and extending from said means to a point in the bottom part of the lower casing member, thereby causing vapor or air to be circulated up through the machine.

8. A washing machine comprising upper and lower sections forming a casing, means for forming an air-tight joint between said sections in assembly, means for withdrawing air from the upper part of the casing, and a discharge conduit for said means open to atmosphere and having communication with the lower part of the casing for the passage of vapor or air therethrough.

9. A washing machine comprising upper and lower casing members, means in the lower casing member for supporting the articles being washed, means in the upper casing member for effecting circulation of vapor or air through said casing members, said casing members being provided with registering conduits for such circulation from the top of said upper casing member to the lower part of said lower casing member.

10. A washing machine comprising upper and lower casing members, means in the upper casing member for effecting circulation of vapor or air through said casing members, said casing members being provided with registering conduits for such circulation from the top of said upper casing member to the lower part of said lower casing member, the conduit in said lower casing member terminating in a restricted opening for passage of air up through the casing.

11. A washing machine comprising a casing, a trough member in the lower portion thereof, said trough member being provided with a slot through its bottom having communication with a source of air supply, and means in the upper part of the casing for effecting circulation of vapor or air through said slot so as to pass up through the casing.

12. A cleaning machine comprising a casing for receiving articles to be cleaned and cleaning fluid, means for withdrawing air from the upper part of the casing, and a conduit leading from said means and having communication with the lower part of the casing, said conduit being open to the atmosphere during operation of the machine.

13. A washing machine comprising a casing for holding articles to be washed, means at the upper part of the casing for withdrawing air from the upper part of the casing, a discharge conduit leading from said means, and a second conduit constantly open to the atmosphere and leading to the lower part of the casing, said discharge conduit opening into said second conduit.

14. A washing machine comprising a casing adapted to receive articles to be washed and cleaning liquid, suction means having an intake communicating with the upper part of the casing, and a discharge conduit leading from said means and having communication with the liquid in the casing when the machine is being operated, said conduit being open to the atmosphere whereby the atmosphere may have access to the liquid.

15. A washing machine comprising a lower casing member for holding articles to be washed, a removable upper casing member cooperating with said lower member to form an enclosed casing, said upper member being formed with an upper chamber, a suction means in said upper chamber, the latter having communication with the portion of said upper member below said chamber, and a conduit open to the atmosphere and leading from said chamber to said lower casing member.

16. A washing machine comprising a receptacle for holding cleaning liquid and articles to be washed, a conduit open to the atmosphere and leading to an opening in said receptacle, a casing member adapted to cooperate with said receptacle to form a substantially enclosed air space when the receptacle contains liquid above the level of said opening, and suction means, said suction means, having an intake having communication with the enclosed air space and a discharge conduit having communication with said first-mentioned conduit.

17. In a washing machine, a casing having an enclosed compartment for holding articles to be washed and a second compartment open to the atmosphere, the lower parts of the two compartments having communication with each other, and suction means carried by the casing and having an intake having communication with the upper part of said enclosed compartment and having a discharge conduit having communication with said second compartment.

18. In a cleaning machine, a casing comprising an enclosed compartment for holding articles to be cleaned and a second compartment having communication with the atmosphere and with the lower part of said enclosed compartment, and suction means carried by the casing and having an intake having communication with the upper part of said enclosed compartment, said suction means having a discharge conduit open to the atmosphere.

19. In a washing machine, a casing comprising upper and lower casing members cooperating to form an enclosed compartment and a second compartment constantly open to the atmosphere, said second compartment having communication with the lower part of said enclosed compartment and said upper casing member having a suction chamber having communication with the upper part of said enclosed compartment and with said open second compartment.

20. A cleaning machine including a casing member open at its top and a cooperating casing member and cover unit comprising a container open at its lower end, said container having at its upper end means forming a suction chamber having communication with the interior of the container proper and having communication with the atmosphere, and a conduit connecting the discharge side of said chamber and the bottom of said first-mentioned casing member.

21. A cleaning machine including a casing member open at its top and a cooperating casing member and cover unit comprising a container open at its lower end, said container having at its upper end means forming a suction chamber, suction means in the suction chamber, said chamber having an intake opening for the suction means and said opening having communication with the interior of the container proper, a baffle shielding said intake opening, and a discharge conduit for said suction means, said discharge conduit having communication with said first-mentioned casing member.

22. A cleaning machine including a casing member open at its top and a cooperating casing member and cover unit including a container open at its lower end, suction means mounted at the upper part of said container, the intake of the suction means having communication with the interior of the container proper, and a discharge conduit leading from the suction means and having communication with the first-mentioned casing member and constantly open to the atmosphere.

23. A washing machine comprising a casing member open at the top and closed at the bottom, and a casing and cover member associated therewith and closed at the top and open at the bottom to form an enclosed washing compartment, said last-mentioned casing member having a suction chamber at its upper end, a suction fan in said chamber, and means for operating said fan mounted upon said last-mentioned casing member, means providing an air conduit having communication with the lower part of the chamber of the first-mentioned casing member and with the suction chamber, whereby fluid circulation may be effected through said washing compartment.

24. A washing machine comprising an enclosed washing compartment having a casing member open at the top and closed at the bottom, and a cooperating casing and cover member closed at the top and open at the bottom, said last-mentioned member having a chamber at its upper end which communicates with the upper part of the washing compartment, air circulating means including a rotating fan in said chamber and a motor for rotating said fan mounted upon said casing and cover member, and a discharge conduit leading from said chamber to the lower part of the first-mentioned casing member.

25. In a washing machine, a liquid holding casing, a removable casing member adapted to cooperate with said casing to form an enclosed washing compartment, a suction chamber integrally formed within the upper part of said casing member, said chamber having an opening communicating with the interior of said casing member, air circulating means including a suction fan within said chamber and a motor mounted upon said removable casing member, and means forming a discharge conduit leading from said chamber and having communication with the lower part of said liquid holding casing, when the latter and said removable casing member are associated in cooperative relation.

26. In a washing machine, a closed receptacle having a bottom opening; means forming a chamber open to the atmosphere; a motor and a fan driven thereby, the intake side of said fan having communication with the inside of said receptacle, said fan discharging into said chamber, the latter having communication with said bottom opening.

27. A washing machine comprising a liquid receptacle, means for withdrawing air from the upper part of said receptacle, and a conduit having communication at one end with the discharge side of said means and terminating at the other end in a restricted opening having communication with the lower part of the receptacle for the circulation of vapor or air through the latter, said conduit being open to the atmosphere.

Signed by me this 9th day of April, 1929.

PERCY E. BARKER.